United States Patent Office 3,552,880
Patented Jan. 5, 1971

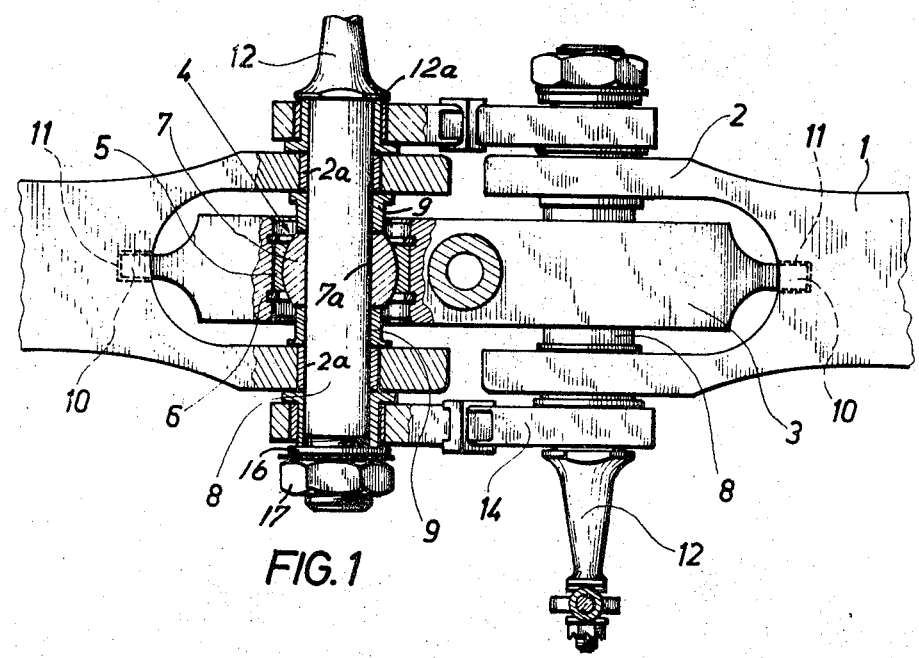
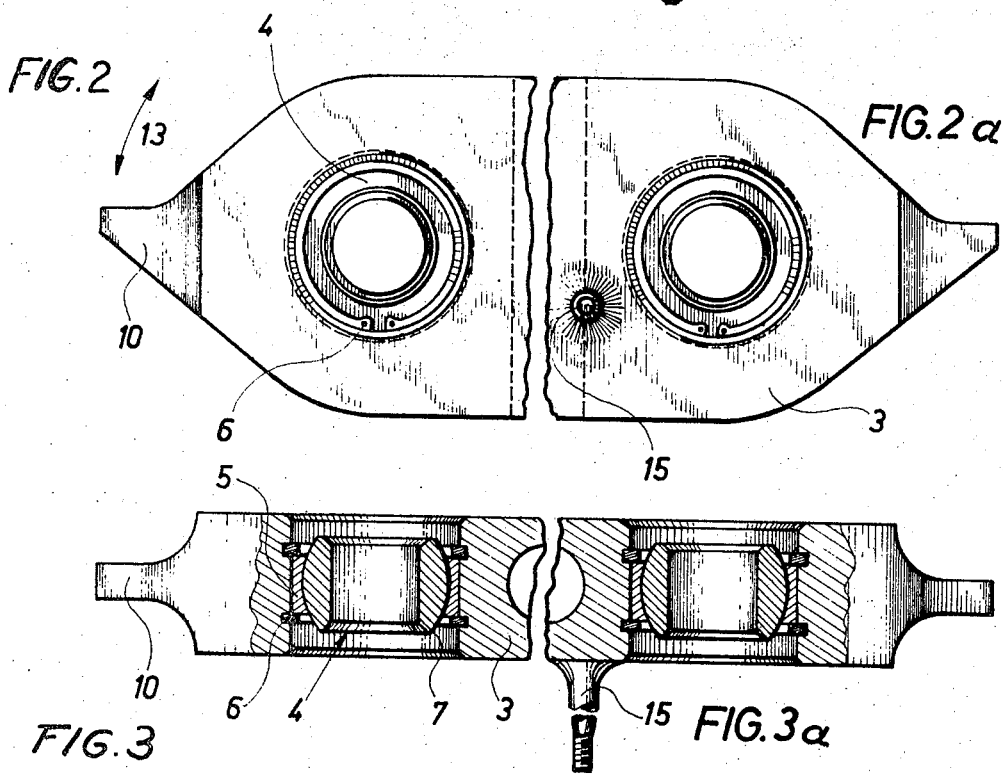

3,552,880
BLADE CONNECTION FOR HELICOPTERS
Christoph Fischer, Bremen, Germany, assignor to Vereinigte Flugtechnische Werke Gesellschaft mit beschrankter Haftung fruher "Weser" Flugzeugbau/Focke - Wulf/Heinkel - Flugzeugbau, Bremen, Germany
Filed Sept. 27, 1968, Ser. No. 763,089
Int. Cl. B64c 27/38
U.S. Cl. 416—104
6 Claims

ABSTRACT OF THE DISCLOSURE

In combination with a helicopter rotor having a shaft and a hub body connected to said shaft, a blade connection which includes: rotor blade means having the inner portion thereof fork-shaped and straddling a portion of said hub body, bolt means extending in a direction perpendicular to the longitudinal extension of said rotor blade means and connecting said inner portion of said blade means to said hub body, and one-joint bearing means including ball body means passed through by said bolt means and having oppositely located peripheral areas of said ball body means flattened where said bolt means enters and leaves said ball body means, said ball body means also including an outer body substantially coaxially arranged with and surrounding said ball body means.

The present invention relates to a blade connection for a helicopter rotor.

In contrast to an air propeller, a helicopter rotor is blown against primarily at a flat angle with regard to the plane of the blade tip. Furthermore, it is necessary that with such a rotor it is possible to effect any desired inclination of the air force resultant in order to assure the necessary steering, especially of a one-rotor helicopter. It is for this reason that generally rotor blades are linked to the rotor hub by means of three bearings. With heretofore known designs, the flapping hinge for the movement of the blade perpendicularly to the axis and perpendicularly to the plane of rotation is formed by a bolt which is journalled in two antifriction bearings. The turning hinge or turning joint for the movement of the blade in the plane of rotation is designed similarly. In some helicopter designs, both joints or links are combined to form a universal joint. Finally, it is necessary that the blade for the individual adjustment of its adjusting angle is rotatable about its longitudinal axis. This is generally realized by a strong axial bearing in combination with radial bearings.

Designs have become known which employ particularly fitted packets of ball bearings with shoulders, the individual bearings of which are not individually exchangeable.

Furthermore, designs have become known in which the flapping movement and the change in the adjusting angle are made possible by elastic spring packets adapted to absorb high centrifugal forces.

Also, one-joint suspensions have become known in which, aside from some bearings, it is not possible to save any customary parts because the blade connecting bolt extends in a structurally unfavorable manner in the longitudinal direction of the blade which, in turn, makes it necessary to employ very wide forks for embracing the balls, which wide forks result in rather unfavorable structural conditions with regard to power transmission, size and weight.

When employing antifriction bearings, due to the often very small angles of the above referred to blade movements, a number of problems occur which have not been solved satisfactorily, and the foremost of which are the formation of pits, large space requirement, or defective lubrication and thereby perhaps a complicated pressure lubricating system.

It is, therefore, an object of the present invention to provide a simplified blade connection which will overcome the above mentioned drawbacks.

It is another object of this invention to provide a blade connection for helicopters which without affecting the required freedom of movement will make possible a low weight, short structural length, less servicing and replacement expenses, improved lubrication and a longer life span.

These and other objects and advantages of the invention will appear more clearly from the following specification, in connection with the accompanying drawing, in which:

FIG. 1 shows a top view of a rotor head according to the invention for two blades with a blade connection.

FIG. 2 shows a view of the rotor hub with the bearing areas for the rotor blades.

FIG. 2a is a slight modification of FIG. 2.

FIG. 3 is a top view partially in section, of the rotor hub, to show the arrangement of the bearing areas, FIG. 3 corresponding to FIG. 1.

FIG. 3a is a top view similar to that of FIG. 3, but corresponding to FIG. 2a.

Figure 4:
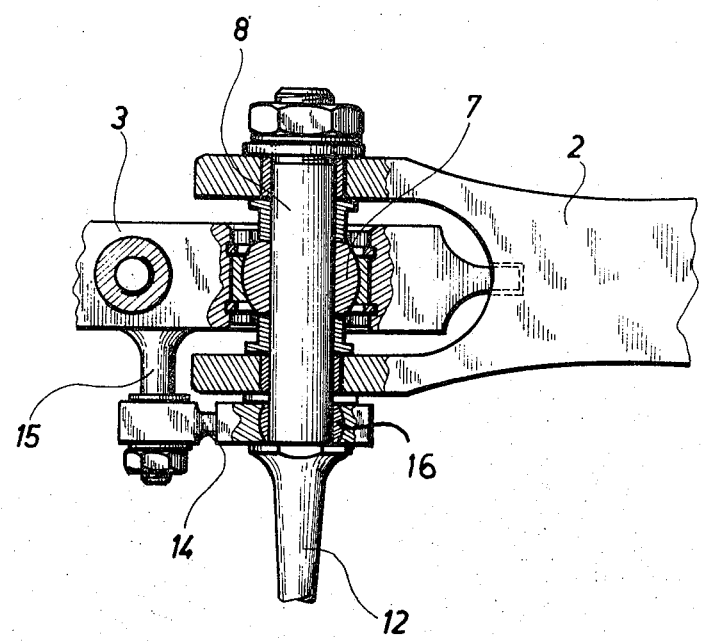
FIG. 4 is a partially sectioned fragmentary view showing further cooperation of parts illustrated in FIG. 3 and similar to FIG. 1 as to interrelationship of such parts.

In conformity with the present invention, there is provided a rotor blade root portion which is open at its end and which embraces in the manner of a fork that portion of the rotor hub which receives the blade. Furthermore, there is provided a blade connecting bolt which extends through the longitudinal axis of the blade and connects the rotor blade root section with the rotor hub. The arrangement according to the invention also comprises a one-joint bearing which includes a ball body flattened on opposite sides and connected to the blade connecting bolt while being passed through thereby, the flattened ball portions being those where the bolt enters and leaves the ball. Finally, the blade connection according to the invention comprises an outer body which centrally surrounds said ball body and is connected in the rotor hub.

Advantageously, the ball body and the outer body of the one-joint bearing is made of any suitable combination of materials having a high wear resistance and requiring a minimum of service such as "Teflon," "Hostaflon," or sinter metal in high grade steel.

Advantageously, the blade conecting bolt is directly provided with any suitable control members for controlling the respective rotor blade. Such an arrangement makes superfluous the heretofore customary construction which in particular for the blade angle adjustment is rather complicated and liable to disturbances. Heretofore the blade angle adjustment had to be extended into the axis of rotation of the blade connecting bolt because otherwise when a difference exists in the tilting and flapping angles, an undesired change in the blade angle adjustment was unavoidable. This drawback has been overcome according to the present invention by the fact that the blade connecting bolt simultaneously acts as transmitting member for transmitting the control movement to the respective rotor blade.

If an angle of transverse stabilizer is employed, such stabilizer is suspended directly on the blade connecting bolt and rests directly on an adjacent blade connecting bolt or on the body of the rotor hub.

Expediently, that portion of the rotor hub which serves for receiving the blade is provided with a nose which, when the rotor is at rest engages a correspondingly designed recess in the fork-shaped root section of the rotor so as to arrest the rotor blade.

Referring more specifically to the drawings, the arrangement shown therein comprises a rotor blade root section 1 which by means of a fork 2 embraces a lamellae-shaped rotor hub 3 having installed therein a one-joint bearing 4. The bearing 4 comprises an outer body 5 which by means of a circlip lock ring 6 is connected to the rotor hub 3. The bearing 4 furthermore comprises a ball body 7 which is provided with a central bore 7a and has its ends adjacent the inlet and outlet of said bore flattened. A blade connecting bolt 8 extends through said bore 7a and also extends through the bores 2a of the corresponding fork 2. This blade connecting bolt 8 is by means of spacer rings 9 and a collar 12a as well as by a washer 16 and nut 17 connected to the bearing 4 in such a way that no axial displacements can occur. A nose 10 on the rotor hub 3—one nose 10 for each rotor blade—extends in a corresponding recess 11 of the respective rotor blade root section 1 and forms an abutment limitation for the flapping movements and the tilting movements of the rotor blades. In the particular showing of FIG. 1, the blade adjustment is effected by means of the blade connecting bolt 8 acting as control lever 12 whereby a number of further elements can be saved. The bearing 4 is so installed that a flapping movement 13 (FIG. 2) will act as a turning movement about the bearing axis.

According to a possible modification, the bearing 4 may be installed at a 90° displacement relative to the showing of FIG. 1, in which instance the tilting movement would permit the largest running angle if it is required. Depending on the desired freedom of movement about the other two axes, the width of the bearing may be selected greater or smaller.

According to the illustrated embodiment there is provided a tilting angle absorber 14 which is suspended directly on the blade connecting bolt 8, and which according to the embodiment of FIG. 1 rests directly on the adjacent blade connecting bolt. This support of the absorber 14 may according to FIG. 2a be effected by means of a pivot 15 directly on the body of the rotor hub 3. If the tilting movement should not only be limited but be prevented altogether, the absorber 14 may be replaced by a stiff element which would not permit any tilting movement.

Numerous tests have proved that when in operation, the power required for adjusting the blade angle is not much higher than with an antifriction bearing. This is due to the fact that in view of a lower angle adjustment, only a small component of the resultant frictional force is to be overcome. Since, in view of the lack of structural precision or in view of tolerances, and also for other reasons sufficient movement prevails in the bearing during a hovering flight, the above mentioned effect also prevails in this condition. This control system is so designed that also without the said effect, a blade angle adjustment would be possible by its own force.

FIG. 4 illustrates how the tilting angle damping means 14 operates together with the stud 15 or projection 15. It is evident therefrom that the arrangement thereof corresponds substantially completely with the illustration of FIGS. 1, 3 of the drawings. The articulated connection or pivotal joinder of the damping means as illustrated in FIG. 1 naturally can be undertaken only on the blade-fastening means or bolt-support of the juxtaposed or oppositely located rotor blade, when a two-bladed rotor is involved. The advantage of this type of connection is recognizable therein that the damping manner or path can be selected to be greater. For a three-bladed rotor, for example, it is necessary, moreover, positively to select a differing fixed or rigid point for the arrangement or mounting of the damping means. For example, such can occur is that the stud or projection 15 is secured on the hub body. In this case the stud or projection 15 forms the fixed or rigid bearing or journalling means for the damping means. Since in this case for reasons of spacing of the stud or projection 15 from the blade fastening means or bolt 8, respectively the extension 12 thereof is shorter and it is purposely advantageous to mount or support the damping means 14 upon the blade fastening means or bolt by way of a spherical bearing or journalling means.

It is, of course, to be understood that the present invention is, by no means, limited to the particular constructions shown in the drawings, but that also modifications are possible within the scope of the appended claims.

1. In combination with a helicopter rotor having a shaft and a hub body connected to said shaft, a blade connection which includes: rotor blade means each capable of turning, adjusting and flapping movement about three axes located at right angles with respect to each other and having the inner portion thereof fork-shaped and straddling a portion of said hub body, bolt means extending in a direction perpendicular to the longitudinal extension of said rotor blade means and connecting said inner portion of said blade means to said hub body, and one-joint bearing means including ball body means passed through by said bolt means and having oppositely located peripheral areas of said ball body means flattened where said bolt means enters and leaves said ball body means, said ball body means also including an outer body substantially coaxially arranged with and surrounding said ball body means.

2. An arrangement further in combination according to claim 1, which includes control means directly connected to the bolt means pertaining to the respective rotor blade means for adjustment of the latter.

3. An arrangement further in combination according to claim 1, which includes tilting angle damping means suspended on the pertaining bolt means.

4. An arrangement further in combination according to claim 1, which includes tilting angle damping means supported by said hub body.

5. An arrangement further in combination according to claim 1, in which said fork-shaped inner portion of said rotor blade means is provided with first means and in which said hub body is provided with second means for engagement with said first means at a standstill of said rotor for arresting said rotor blade means.

6. An arrangement further in combination according to claim 1, in which said ball body means consist of a combination of wear resistant material requiring substantially no servicing.

References Cited

UNITED STATES PATENTS

| | | | |
|---|---|---|---|
| 2,830,669 | 4/1958 | Klockner | 170—160.58UX |
| 2,995,192 | 8/1961 | Scheutzow | 170—160.58UX |
| 3,106,965 | 10/1963 | Gorndt et al. | 170—160.55X |
| 3,129,766 | 4/1964 | Pertusio et al | 170—160.55X |
| 3,187,820 | 6/1965 | Maloof | 170—160.55 |
| 3,193,019 | 7/1965 | Drees et al. | 170—160.58X |
| 3,265,136 | 8/1966 | Wojciechowski et al. | 170—160.55 |

EVERETTE A. POWELL, JR., Primary Examiner

U.S. Cl. X.R.

416—107, 141